United States Patent [19]

Righi

[11] 4,136,367

[45] Jan. 23, 1979

[54] APPARATUS FOR REPRODUCING AND/OR RECORDING MAGNETIC TAPE IN CASSETTES

[75] Inventor: Nardino Righi, Milan, Italy

[73] Assignee: Ri-El Ricerche Elettroniche S.p.A., Cologno Milanese, Italy

[21] Appl. No.: 800,118

[22] Filed: May 24, 1977

[30] Foreign Application Priority Data

May 25, 1976 [IT] Italy ............................. 12643 A/76

[51] Int. Cl.² ................................................ G11B 15/24
[52] U.S. Cl. ...................................................... 360/96
[58] Field of Search ......................................... 360/96

[56] References Cited

U.S. PATENT DOCUMENTS

| | | | |
|---|---|---|---|
| 3,578,261 | 5/1971 | Yamamoto | 360/96 |
| 3,959,821 | 5/1976 | Nardino | 360/96 |
| 3,987,486 | 10/1976 | Ito et al. | 360/96 |
| 4,044,391 | 8/1977 | Takahashi | 360/96 |

Primary Examiner—Robert S. Tupper

Attorney, Agent, or Firm—Edwin E. Greigg

[57] ABSTRACT

A recording and/or reproducing apparatus for magnetic tape in cassettes comprises a fixed frame plate, onto which there is slidably mounted a cassette receptacle movable in the direction of introduction and expulsion of the cassette. To the slide receptacle there is articulated a carrier plate which carries the tape reel shaft, the tape drive capstan and the electric motor. The cassette receptacle is connected to the carrier plate by means of a flexible element, in the form of a flexible strip made of metal sheet, which acts as an element of transmission of the movement of the carrier plate. Hence, upon movement of the cassette receptacle in the direction of introduction of the cassette, the carrier plate, which moves in the said direction together with the cassette receptacle, is also caused to move upwards towards the cassette receptacle, in unison with same. And the reverse is also true. Upon releasing the cassette receptacle for the removal of the cassette, the receptacle moves outwardly after the carrier plate moves downwardly away from the cassette receptacle.

1 Claim, 12 Drawing Figures

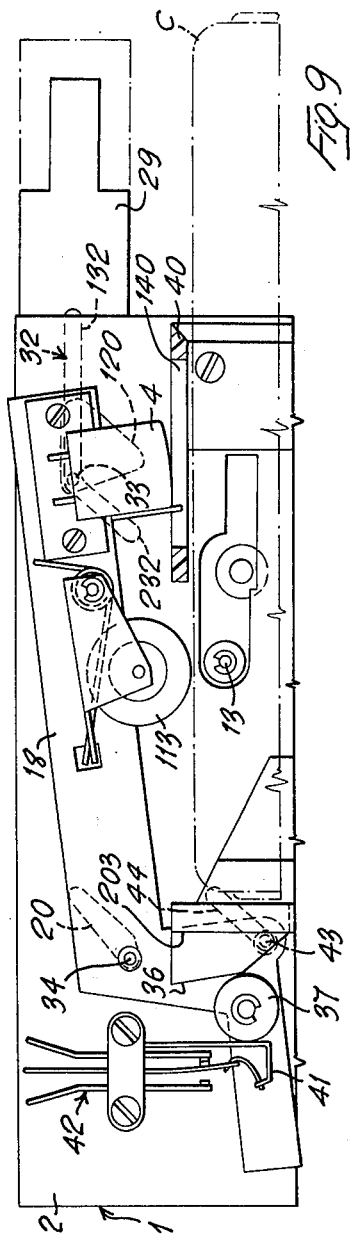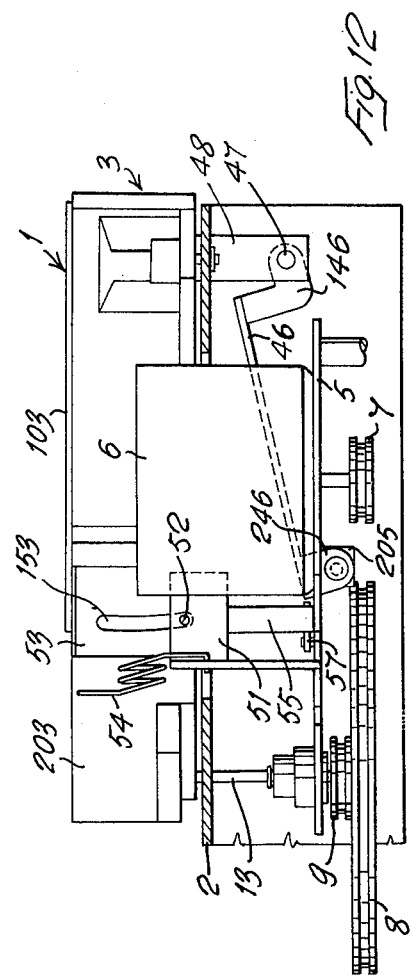

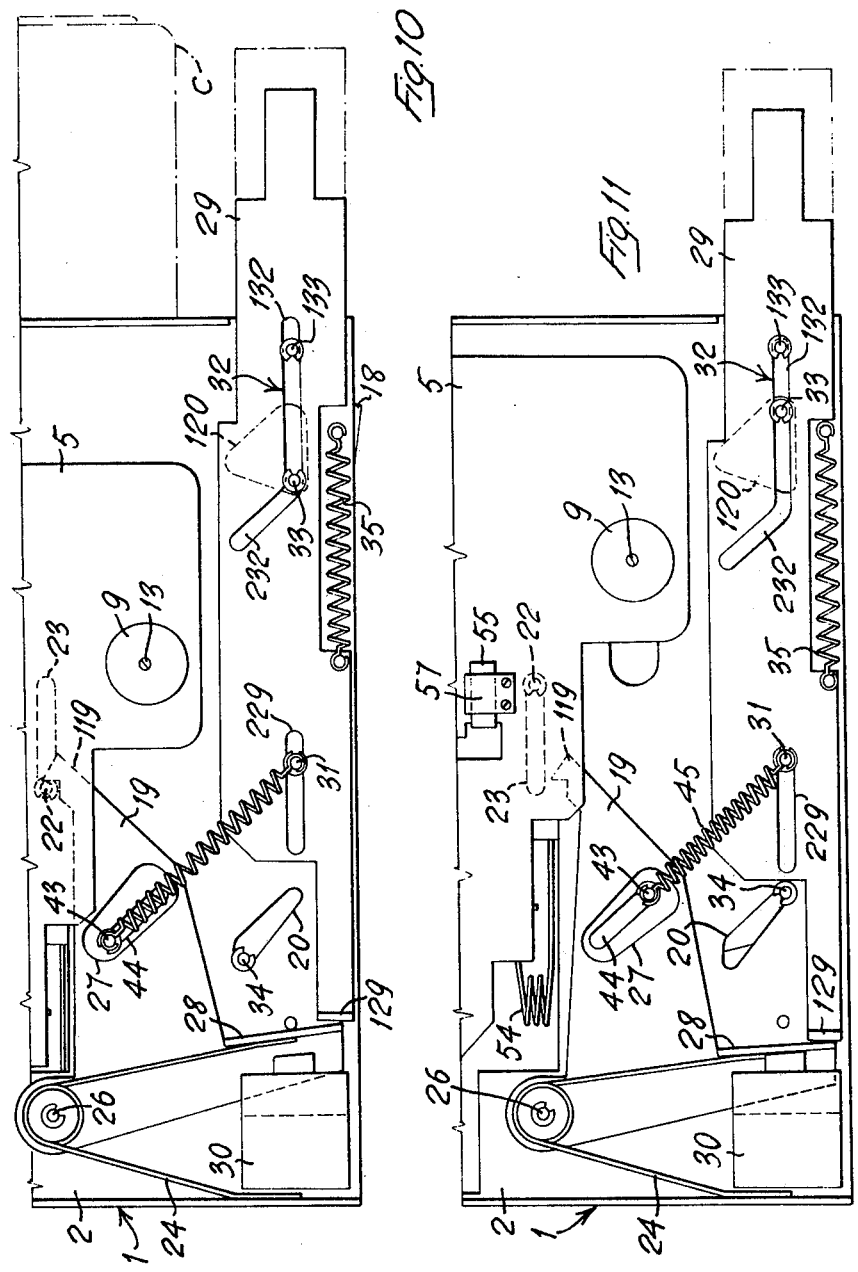

APPARATUS FOR REPRODUCING AND/OR RECORDING MAGNETIC TAPE IN CASSETTES

SUMMARY OF THE INVENTION

The present invention relates to an apparatus for reproducing and/or recording magnetic tapes in cassettes, of the type particularly adapted to be mounted on automobiles.

An apparatus of this type requires, among others, to be particularly compact, that is to say to present very reduced dimensions, since the space available in an automobile, particularly in proximity of the driver's seat, is very limited. This space requirement does not create any difficulty for what concerns the electronic circuitry, where printed and integrated circuits are now commonly used which solve the problem of space in a completely satisfactory manner.

The problem remains however for the tape transport mechanism, i.e. the plurality of components which ensure the transport of the tape which is to be reproduced and/or recorded, and the correct introduction and removal of the cassette.

According to the invention, there is proposed a novel apparatus which is characterized by the features that the tape reel shaft which is intended to engage the tape reel of the cassette, and the drive capstan for driving the tape at a constant speed are arranged on a carrier plate which is pivoted to a slide receptacle for the cassette, said slide receptacle being capable of sliding inward and outward, with respect to the direction of introduction of the cassette, on a fixed frame plate. The carrier plate and the slide receptacle for the cassette are also relatively movable in a vertical direction in unison with each other. The receptacle and the carrier plate are operatively connected to each other by means of a flexible metal strip which acts as an element for the transmission of movement, whereby upon movement of the cassette receptacle in either the direction of introduction or removal of the cassette, the cassette receptacle and the carrier plate are caused either to move towards or away with respect to each other, thus providing for a safe and reliable engagement or disengagement of the reel shaft and drive capstan carried by the carrier plate with the reel tape and tape of the cassette carried by the cassette receptacle.

BRIEF DESCRIPTION OF THE DRAWINGS

The above and other features of the invention and the advantages deriving therefrom will appear evident from the following description of a preferred embodiment of same, made with reference to the attached drawings, in which:

FIG. 9 is a partial plan view from the top showing the detail of an intermediate position of the carrier slide which carries the magnetic head for the recording and/or reproduction and the pinch roll which cooperates with the drive capstan, with the cassette introduced in the receptacle;

FIG. 10 is a partial plan view from the bottom, corresponding to the view of FIG. 9;

FIG. 11 is a partial view from the bottom similar to that of FIG. 10, with the carrier slide pushed down to the bottom of its travel, in order to disengage the locking pawl which locks the receptacle in its operative position;

FIG. 12 is a partial section, with the omission of some parts for the sake of clarity, along lines XII—XII of FIG. 1.

DESCRIPTION OF THE PREFERRED EMBODIMENT

Figure 1:
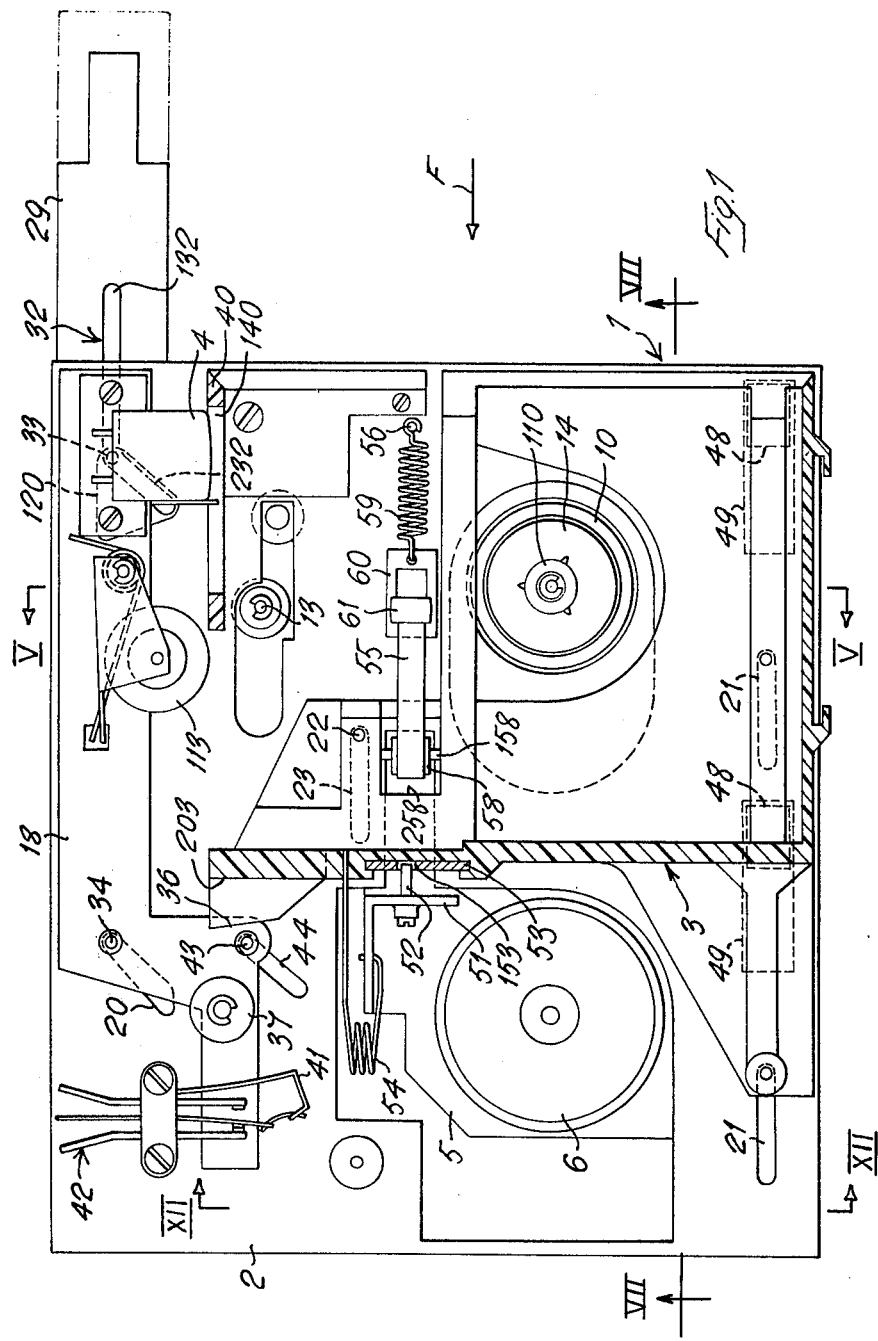
FIG. 1 is a plan view from the top, with parts in section, of the structural assembly and of the mechanical components of an apparatus according to the invention, in its non-operative or waiting position, i.e. when the cassette is not introduced.
Figure 2:
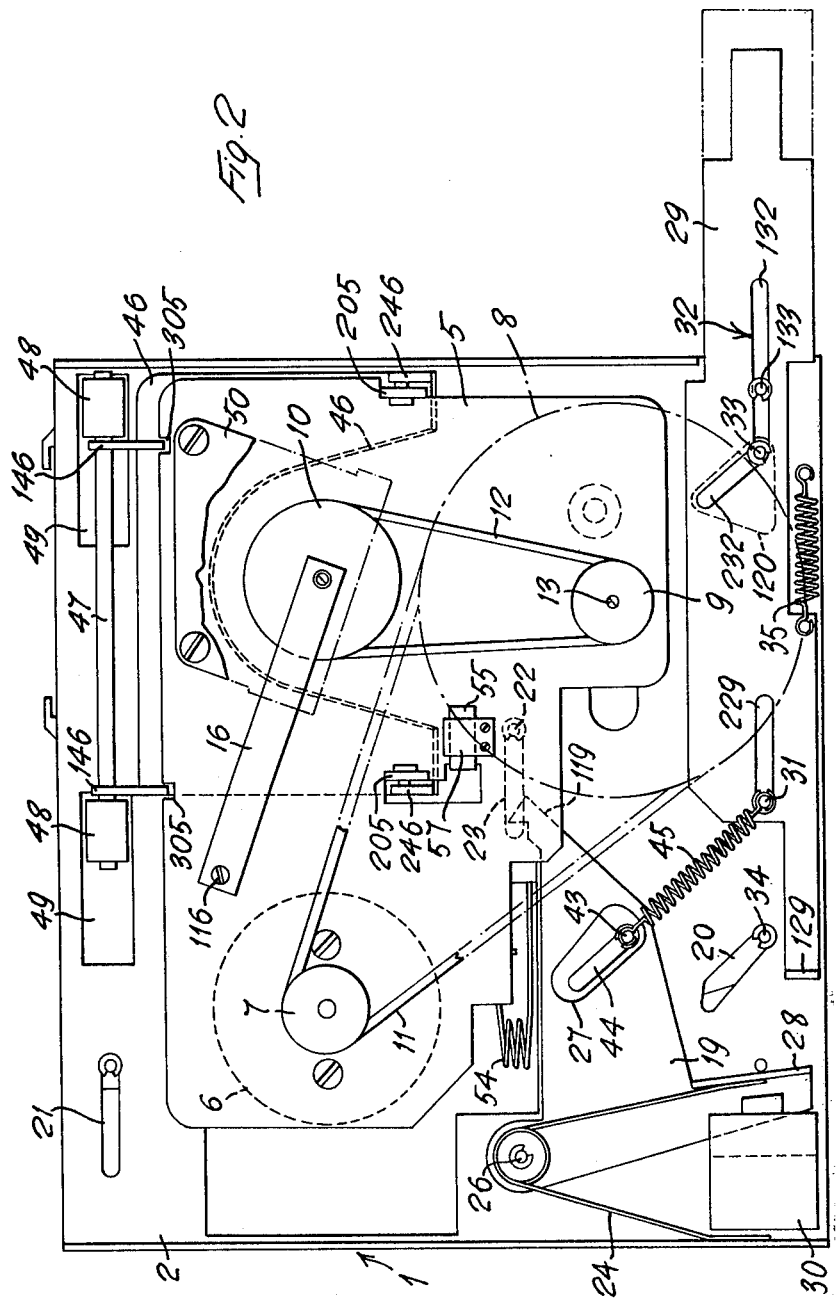
FIG. 2 is a plan view from the bottom, corresponding to the view of FIG. 1.

With reference to the drawings, and particularly to FIGS. 1 and 2, the tape transport mechanism of a cassette reproducer comprises a fixed frame plate 2, a slide receptacle 3 mounted on said frame 2 guided slidably in a direction F of introduction and removal of the cassettes C, which cassettes C are introduced in order to be reproduced by the reproducer head 4 of FIG. 1, which is operatively associated with the slide receptacle 3 to move therewith.

Figure 5:
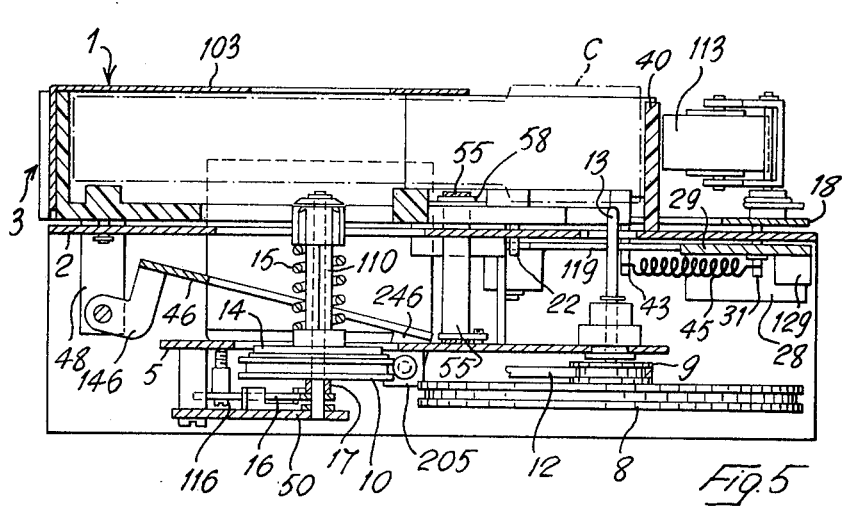
FIG. 5 is a transverse section along line V—V of FIG. 1.

Joined to the slide receptacle 3 is the carrier plate 5 which supports the tape transport mechanism, i.e. the several components for driving the tape of the cassette. As seen in FIG. 2, these components receive their drive from an electric motor 6 and, through suitable transmissions which comprise the pulleys 7, 8, 9, 10 and the belts 11, 12 impart a constant speed drive to the tape drive capstan 13. The drive to the tape reel shaft 110 is transmitted from the said drive capstan 13 through the transmission 9, 10, 12 and a friction coupling. As best seen in FIG. 5, the adjustable friction coupling consists of a coupling disc 14, of a loading spring 15 and of a swing lever 16 which supports a bearing element 17.

According to the present invention, the said tape transport mechanism components are mounted on the carrier plate 5. The pinch roll 113, together with the magnetic head 4, is mounted on the carrier slide 18 as is seen in FIGS. 1 and 9.

As seen in FIG. 1, the said carrier slide 18 is mounted on the frame 2 at one side of the receptacle 3, and is slidably guided parallel to, and towards and away from same, through pin engagement in the oblique guide slots 20, 44 in the surface of the frame plate 2, while the receptacle 3 is guided through pin engagement in the longitudinal guide slots 21 and 23 of the said frame plate 2. Looking at FIGS. 2, 4, 10 and 11 whenever the slide receptacle 3 is pushed in to full extent due to the loading of a cassette C, the locking pin 22 provided on the receptacle 3 and which projects downwardly through the slot 23, in the first place causes the swinging to the side of the locking portion 119 of the locking pawl 19 and then the pin remains locked due to the returning effect of the spring 24 of the locking pawl itself.

The locking pawl 19 is hinged at 26 to the frame plate 2 and is provided with a slot 27 and with a disengagement plate 28, which is intended to cooperate with the pressing end 129 of the disconnecting slide bar 29 which is slidably mounted on frame plate 2. As an alternative to the manual unlocking effected through bar 29, there is provided also for an automatic unlocking which comprises an electromagnet 30 acting on the disengagement plate 28 (of ferromagnetic material) so as to promote the swinging of pawl 19, as is shown in FIGS. 10 and 11.

Figure 3:
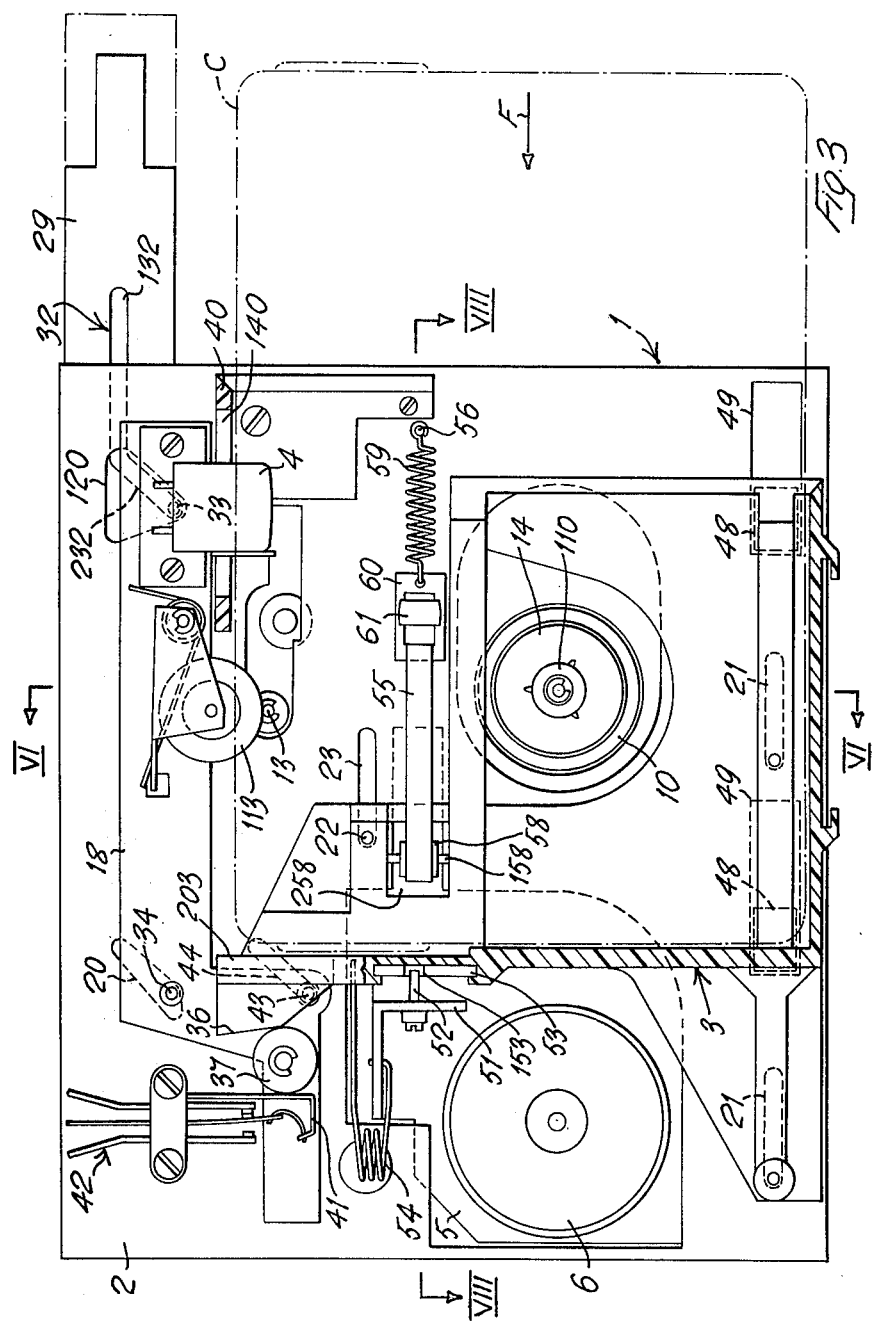
FIG. 3 is a view similar to that of FIG. 1, with the cassette in place.
Figure 4:
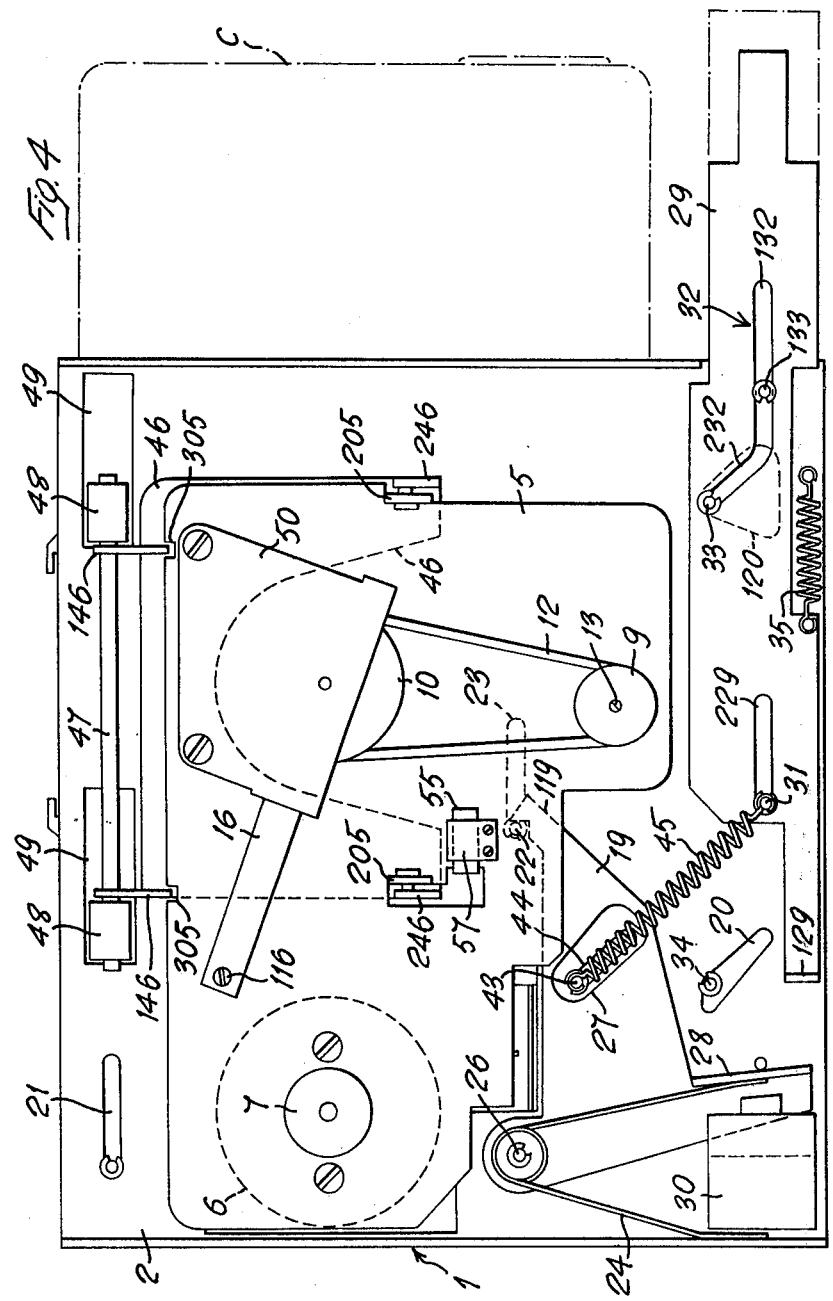
FIG. 4 is a view similar to that of FIG. 2, with the cassette in place.

The functional association between the carrier slide 18 and the disconnecting slide bar 29 is obtained in the following manner, as is seen in FIG. 2: the disconnecting slide bar 29 is guided longitudinally due to the engagement of its guide slot 229 with a pin 31 on the lower face of the horizontal surface of the frame plate 2 and to the engagement of another guide slot 32 with a pin 133 which is also arranged on the lower face of plate 2. Engaged in the guide slot 32 is a second pin 33 which is provided on slide 18 and projects downwardly through a triangular clearance hole or slot 120 formed in the frame plate 2. The guide slot 32 has a portion 132 which is aligned with the slot 229, and a portion 232 which is substantially parallel to the oblique slot 20 in which is located the pin 34 provided in correspondence of the head 4 of the slide 18, as is seen in FIGS. 1 and 3. A tensioned helical spring 35, shown in FIGS. 10 and 11, acts as a return spring for the slide bar 29. From the above it appears evident that the carrier slide 18 and the disconnecting slide bar 29 operate the one superposed to the other, more precisely one above and the other below the horizontal surface of the frame plate 2.

When the apparatus is unloaded, as is seen in FIG. 1, the carrier slide 18 is positioned off to the side, so as to keep the magnetic head 4 and the pinch roll 113 out of the introduction path F of the cassette C inside the receptacle 3. The said receptacle 3 presents an upper cover plate 103, as is seen in FIG. 5, for correctly guiding at its interior the cassette C, as is usual in this type of devices.

In the same unloaded postion, the carrier plate 5 is kept at a maximum distance from the lower face of frame plate 2, in such a manner that the drive capstan 13 and the reel drive shaft 110 do not interfere with the loading operation of the cassette C into the receptacle 3, again as seen in FIG. 5.

As is seen in FIG. 9 when the receptacle 3 is fully pushed in upon introduction of a cassette (arrow F), the profile of a face cam 36 of the receptacle 3 engages the idle roller 37, which, due to the inclined profile of the cam 36, is compelled to move inwardly behind the back 203 of the receptacle 3. In this manner, the carrier slide 18 is caused to translate laterally, as is seen in FIG. 3, guided by the pins 34, 43, 33 which engage the guide slots 20, 44, 232 respectively position shown in FIG. 3.

The side translation of the carrier slide 18, in the last portion of its movement, brings the said roller 37 (made of insulating material) to act upon the switch element 41 of a switch 42, as shown in FIG. 3, which controls, in the usual manner, the starting of the operation of the electrical circuit of the apparatus, and is supported from plate 2.

The carrier slide 18 carries also a pin 43 which projects downwardly through an oblique slot 44 formed in the frame plate 2. As shown in FIG. 2, the said pin 43 serves as an anchoring element for a tensioned helical spring 45, the other end of which is anchored to the fixed pin 31 on which there slides the guide slot 229 of the disconnecting slide bar 29. In this manner, the translation of the carrier slide into its operative position promotes a further tensioning of the spring 45, thus loading same for the subsequent return of the carrier slide itself, which takes place together with the return movement of the receptacle 3 to its waiting position.

Referring to FIGS. 9 and 10, there are shown the relative positions of the carrier slide 18 and of the disconnecting slide bar 29, in an intermediate position in which the locking pawl 19 which locks the receptacle 3 in the working position has not yet been disengaged under the action of the pressing end 129 of the slide bar 29. However, the partial inward sliding of said slide bar has already caused the pin 33 of carrier slide 18 to move to the bottom of the oblique portion 232 of the slot 32, as seen in FIG. 9, so that the carrier slide will have moved outwardly bringing away from contact with the tape the pinch roll 113 and the magnetic head 4, shortly before the receptacle is moved outwardly by spring action, as a consequence of the disengagement of the locking pawl 19.

Figure 6:
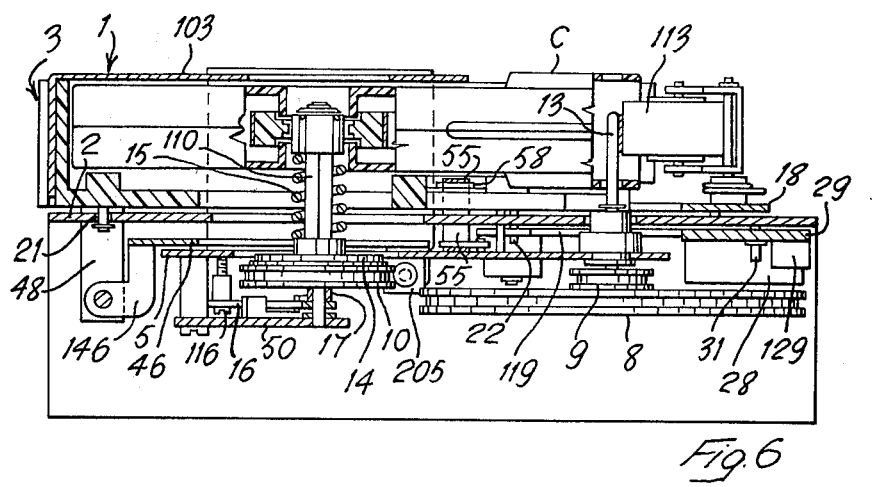
FIG. 6 is a transverse section similar to that of FIG. 5, with the cassette in place.

As is seen in FIGS. 2, 5 and 6, the carrier plate 5 is hinged to the receptacle 3 for the cassette C by means of a small U-shaped frame 46, which has the ends of the base of the U-profile hinged by means of ears 146 to a hinge axis 47 which is horizontally supported, in the same sliding direction of the receptacle 3, between a pair of lugs 48 which extends downwardly from the bottom of receptacle 3, through respective slots 49. In correspondence of the extremity of each one of the arms of the U-profile, the U-frame 46 is hinged by its ears 246 to corresponding ears 205 of the carrier plate 5, along a common hinge axis which is parallel to axis 47. Moreover, the plate 5 presents side indentations 305, as seen in FIG. 2, for the edges of ears 146 thus providing guide elements for the movement of translation of the said carrier plate 5.

On the carrier plate 5 there is, as above mentioned, arranged the proper tape transport mechanism. In FIGS. 2, 5 and 6 there is clearly visible the swinging lever 16 for the adjustment of the friction coupling between the tape reel shaft 110 and the driving pulley 10. 50 indicates the supporting frame on which the lever 16 is fulcrumed, and 116 is the adjustment screw, for adjusting the friction coupling.

Figure 7:
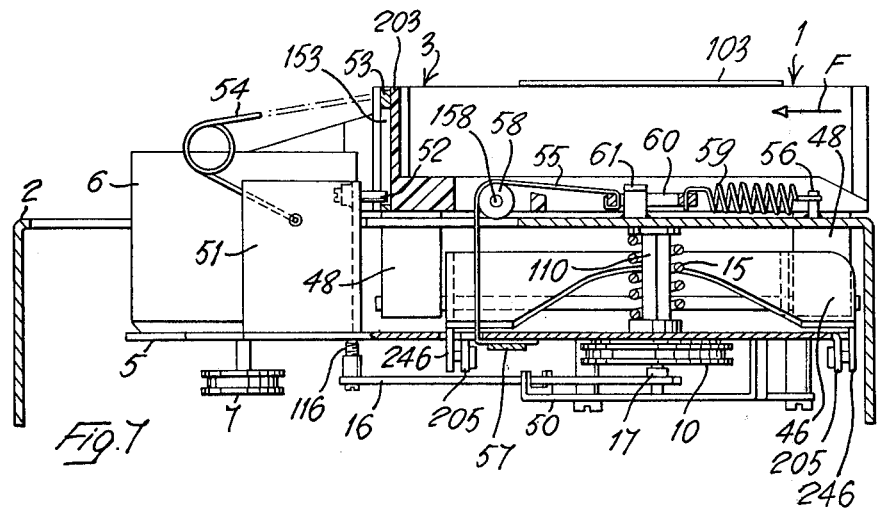
FIG. 7 is a longitudinal section along line VII—VII of FIG. 1.
Figure 8:
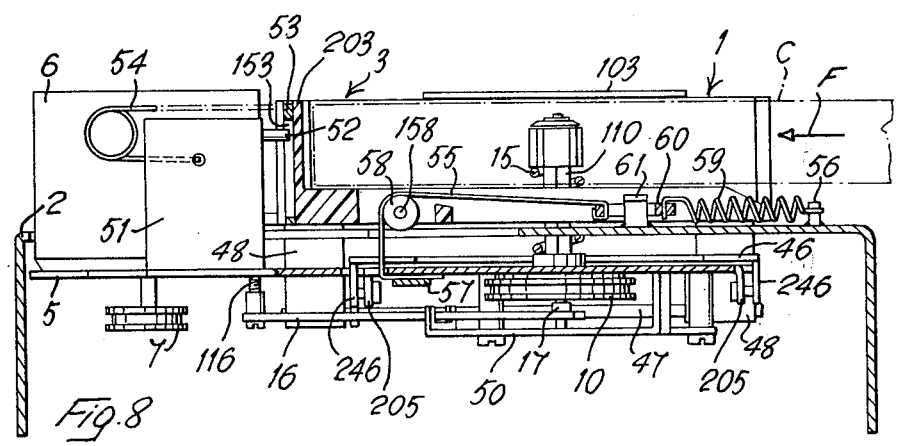
FIG. 8 is a longitudinal section similar to that of FIG. 7, with the cassette in place.

Referring to FIGS. 7, 8 and 12, the carrier plate 5 presents moreover a vertical upright 51 which is provided with a screw pin 52 which engages a vertical slot or guide 153 of a metallic plate 53 arranged on the back of the receptacle 3. Between the said upright 51 and the back of the receptacle 3 there acts also a return spring 54 which tends to maintain the carrier plate 5 and the receptacle 3 moved apart the one from the other (in non-working position), as shown in FIG. 7.

According to the main characteristic feature of the invention the relative movement of translation of the carrier plate 5 with respect to the slide receptacle 3, during the loading of the cassette inside the said receptacle, is obtained by the provision of a flexible strip element 55, as seen in FIGS. 7 and 8, which is anchored at one end by means of frame 60 and spring 59 to a fixed point 56 of the upper face of the frame plate 2, and at its other end to a point 57 of the carrier plate 5. This flexible strip 55 is guided along a portion which is intermediate between its ends, over a guide roller 58 supported by the slide receptacle 3, so that the horizontal inward sliding movement of the said receptacle 3 promotes the movement of the strip 55 over the guide roller 58, and the consequent lifting of the plate. The downward return of the plate 5 takes place due to elastic return means 54, plus the tensioning spring 59 for the flexible tension strip.

With particular reference to FIGS. 1, 7, 3 and 8, the flexible strip 55 is a ribbon or strip of metal sheet, and the roller 58 is mounted on a pin 158 which is supported in a recess 258 of receptacle 3. The end of strip 55 above the frame plate 2 terminates into a movable anchoring frame 60 which is definitely anchored to the fixed point 56 through the spring 59, and which performs very limited movement relative to a fixed guide pin 61, which engages same in a slidable manner.

The tensioning of spring 59 depends upon the position of the receptacle 3, and varies from a minimum corresponding to the non-operating position (see FIG. 7) to a maximum corresponding to the position of operation of the apparatus (see FIG. 8) in which position, because of the upward translation of the carrier plate 5, the tape transport mechanism carried by said carrier plate 5 comes to operatively engage the cassette C.

It is to be noted that the residual spring force in the spring 59 at the end of the return stroke (FIG. 7) ensures a firm and precise stop of the said receptacle in its unloaded position, thus avoiding any undesired vibrations.

It is believed that the invention will have been clearly understood from the foregoing detailed description of a preferred embodiment. Changes in the details of construction may be resorted to without departing from the spirit of the invention, and it is accordingly intended that no limitation be implied and that the hereto annexed claims be given the broadest interpretation to which the employed language fairly admits.

I claim:

1. An apparatus for reproducing and/or recording magnetic tape in cassettes comprising, in combination, a fixed frame plate, a cassette receptacle for carrying a cassette supported on said frame plate for horizontal sliding movement in the direction of introduction and expulsion of the cassette in the receptacle, a carrier plate having a tape transport mechanism mounted thereon supported on said receptacle for both sliding movement therewith and for vertical movement towards and away from said receptacle, a strip of flexible material connected at one end to said frame plate and at the other end to said carrier plate, a guide roller mounted on said receptacle for sliding engagement with said flexible strip to effect a movement of said carrier plate towards said receptacle during the introduction of said cassette into said receptacle for engagement of said tape transport mechanism with said cassette and means connected to said carrier plate and said receptacle for yieldingly urging said carrier plate away from said receptacle.

* * * * *